Nov. 10, 1970 C. E. BAKER 3,539,717

TOUCH CONTROL DISPLAY SYSTEM

Filed Sept. 25, 1967 2 Sheets-Sheet 1

CHARLES E. BAKER
INVENTOR

BY René E. Grossman

ATTORNEY

Nov. 10, 1970 C. E. BAKER 3,539,717

TOUCH CONTROL DISPLAY SYSTEM

Filed Sept. 25, 1967 2 Sheets-Sheet 2

United States Patent Office 3,539,717
Patented Nov. 10, 1970

3,539,717

TOUCH CONTROL DISPLAY SYSTEM

Charles E. Baker, Dallas, Tex., assignor to Texas Instruments Incorporated, Dallas, Tex., a corporation of Delaware Filed Sept. 25, 1967, Ser. No. 670,110
Int. Cl. H04n 3/02
U.S. Cl. 178—7.6 7 Claims

ABSTRACT OF THE DISCLOSURE

An electro optical system is shown for conveying information to a computer or the like by displaying an image having many information cells on a display medium using a scanning light beam, bringing a pointer or finger near an information cell of interest and detecting the light reflected from the display medium as a result of the proximity of the pointer or finger. The signal resulting from the detection of the reflected light is used with the known scan pattern of the moving light beam to determine the position of the information cell of interest. Knowing this position, a computer can then compare the position with the known layout of the information containing image and determine which information bit or bits were pointed to.

This invention relates to an information transfer system and more particularly to an electro optical system for transferring information from an information source to a computer or other information processing machine.

Information transfer devices, such as keyboards, for transferring information between a user and a data processing machine usually suffer from a lack of flexibility of the input format when such transfer is to be in "real time." In addition, they usually require an electrical connection directly to the data processing machine.

Accordingly, it is an object of this invention to provide a "real time" man-machine information transfer device which allows a wide variety of input formats and requires no direct connection to the machine receiving the information.

Another object of the invention is to provide a device which detects the presence of a reflective object in the proximity of a diffusing screen by sensing changes in the amount of light reflected from such a screen.

A further object of the invention is a device which provides information transfer by detecting changes in light reflected from a particular point or area on a diffusing screen.

These and other objects will be better understood by reference to the following detailed description, appended claims and attached drawings.

In brief, the invention encompasses a diffusion screen having a beam of light impinging thereon. Touching the diffusing surface of the screen with a reflective object causes some portion of the light to be reflected back in the direction of transmission. A light sensitive device located on the opposite side of the screen detects the light reflected from the object, thus indicating the presence of the object at the screen. By correlating the time at which the photosensitive device detects the reflected light with the time rate at which a light beam moves, the position of the object can be determined.

Figure 1:
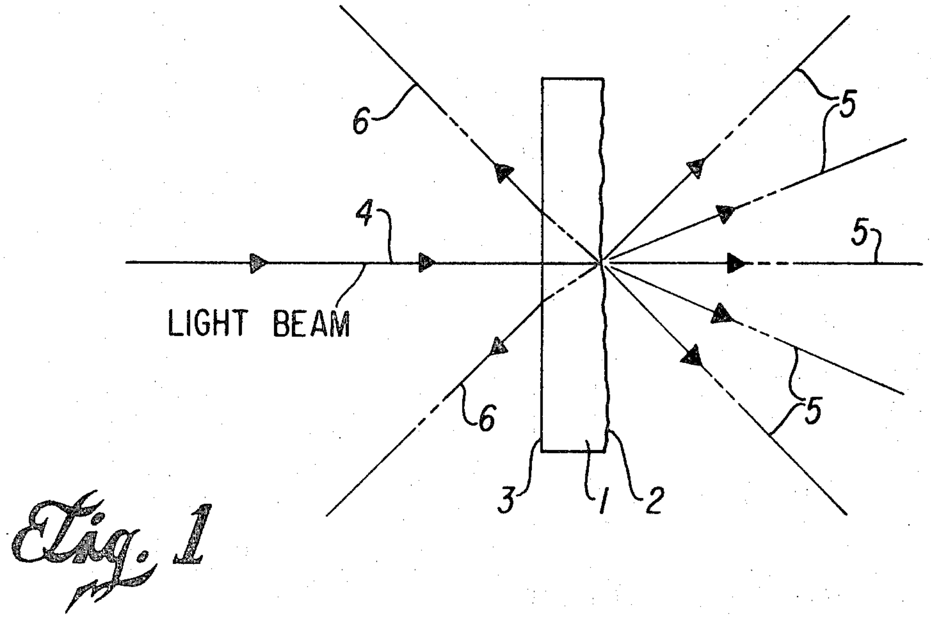
FIG. 1 is a side view in cross section of a diffusing screen with a light beam impinging on the diffusing surface of the screen.

Referring now to the drawings, FIG. 1 shows a side viw of the ground glass diffusing screen 1 having a rough or ground back surface 2 and a planar front surface 3. A narow beam of light 4 (which in the preferred embodiment is a beam of laser light) is directed at the screen and upon striking the rear surface 2, the beam of light becomes scattered and diffused. Portions 5 of the diffused light will be forwardly transmitted through and beyond the rear surface; another portion (not indicated in the drawing) will be reflected toward the front surface 3 at the critical angle of reflection, such that that portion of light will be rereflected by the front surface; and a third portion will be reflected backward passing through front surface 3 as at 6.

Figure 2:
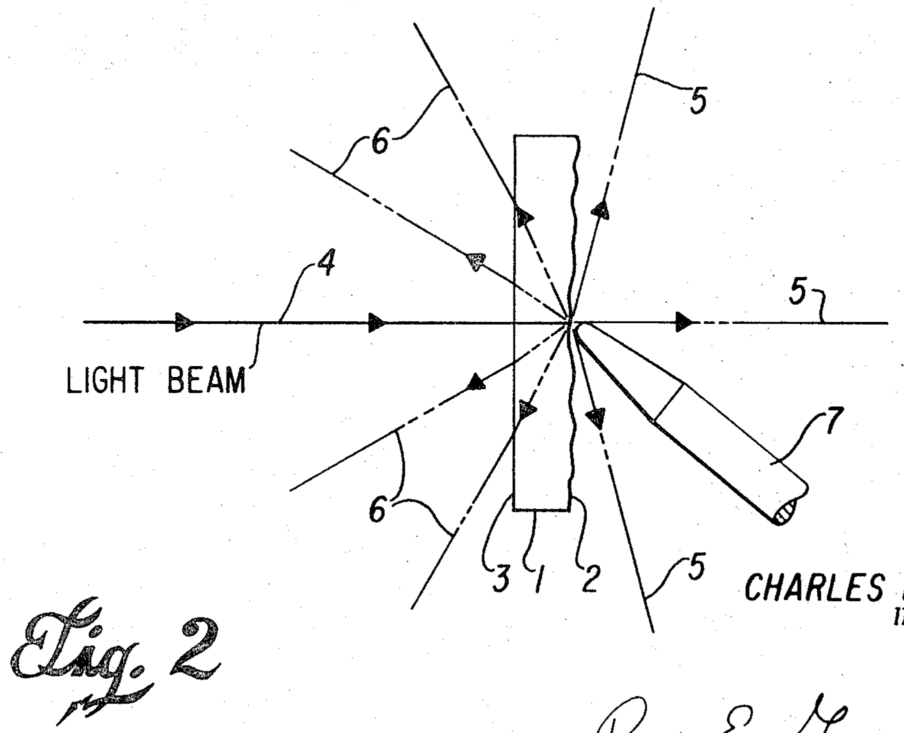
FIG. 2 is the same as FIG. 1 with a pointer or wand touching the diffusing surface of the screen.

In FIG. 2 a reflective object, such as a pointer 7 with a reflective tip, is shown touching rear surface 2 of the screen near to or at the point where the light beam impinges upon rear surface 2. Due to the reflectivity of the tip, its presence at the rear surface 2 will cause some of the light which previously had passed through surface 2 to the right (as indicated in FIG. 1) to be now reflected to the left. Some of this reflected light will pass through surface 3 of the screen and thus increase the intensity of the light at the front surface in the proximity of the point opposite the point on rear surface 2 touched by the pointer 7. Although the above description is given in connection with a sheet of ground glass as a diffusing screen, other types of diffusing screens are commercially available and may be used as, for example, the Polacoat diffusing screen made by Polacoat Incorporated of Blue Ash, Ohio. Moreover, while a pointer 7 is illustrated as the object touching the screen, any other reflective object is intended to be encompassed by the illustration, and in fact the effect can be acomplished using a human finger, although the proximity to the screen required would, of necessity, be closer than with a highly reflective object.

Figure 3:
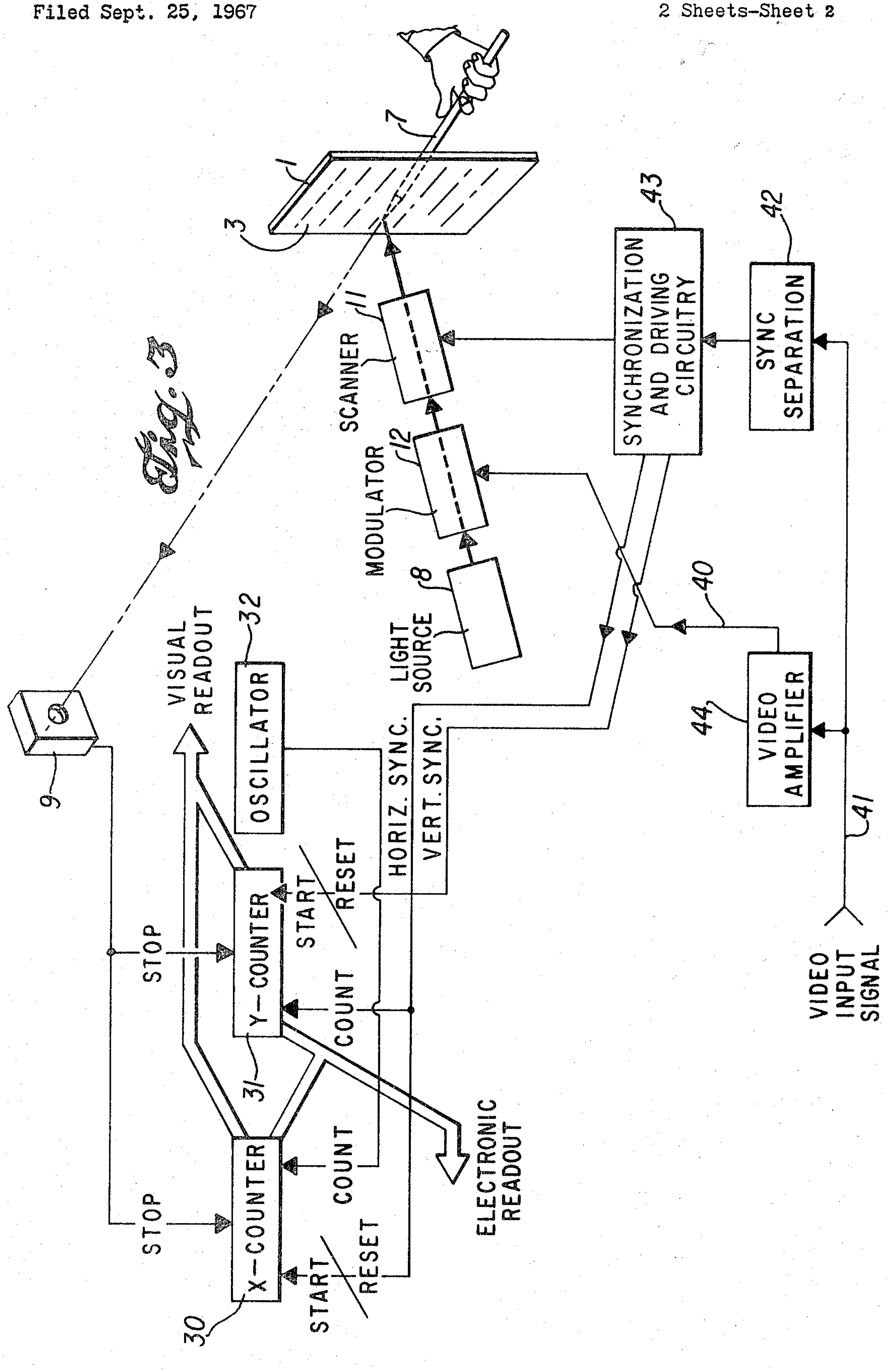
FIG. 3 is a schematic representation of the major elements of the information transfer system according to the present invention.

FIG. 3 illustrates a complete system, using the above described principles, for determining position information. In that figure, a diffusing screen 1, as previously described, is shown with a pointer 7 touching a point thereupon. In order that the light reflected from the touched point convey meaningful position information, it is essential that light beam 4 impinging on screen 1 traverse the screen in some regular pattern having a known relationship between position on the screen and time (measured from the beginning of the pattern). This pattern is provided by scanner 11 located between light source 8 and screen 1 and operating on the light beam from source 8. The scanner operates from the horizontal and vertical synchronization pulses contained in the video output signal 41. The sync pulses are separated from the video signal by the sync separation circuitry 42 and applied to the synchronization and driving circuitry 43 which drives the scanner 12 and also provides an input to counters 30 and 31 which will be described subsequently. The scanner 11, in order to provide a pattern which provides substantially uniform coverage of screen 1, generates a raster scan pattern. Such a scanner generating such a raster scan pattern is more fully described in copending application Laser Display, Ser. No. 439,857, filed Mar. 15, 1965, by C. E. Baker, et al. and assigned to the same assignee as the present application. Said copending application is incorporated herein by reference. The scanner described in said copending application is the preferred embodiment of the scanner of this invention.

Although the raster scan pattern above described provides information about the X–Y coordinates of the point touched on the screen, greater utility is achieved when the moving light beam is modulated by some pattern containing information of interest which may be displayed on screen 1. The beam is modulated by modulator 12 which is driven by modulating signal 40 from video amplifier 44 which amplifies the video input signal to a level suitable for acting upon the modulator. A preferred embodiment of the modulator is the KDP (potassium-dihydrogen-phosphate) modulator described in U.S. Pat. No. 3,402,002. The video input signal for such a pattern can be derived from a TV camera focused on the image of interest, a flying spot scanner scanning a transparency of the image of interest, a computer programmed to generate modulating signals of a particular pattern of interest (e.g. a graphical display) etc. As an example, a pattern of a typewriter keyboard could be so displayed and touching a key would cause the letter or numeral there displayed to be transferred to a computer forming part of an instruction or the like.

Turning now to a discussion of the means for determining that a point on the screen has been touched and a means for determining the position of the point touched, reference is initially made back to FIG. 2. In that figure, it was shown that the presence of a reflective object on or in proximity to the diffusing surfaces of screen 1 would cause an increase in the light intensity at the point on surface 3 of the screen opposite the touched point on surface 2 when light impinged at the touched point. In FIG. 3, a photodetector 9 sensitive to light coming from surface 3 of screen 1 is mounted to the left of that screen and will thus detect any increase in the reflected light from screen 1. At this point, the presence of a reflective object to the right of the screen can be determined but not its position relative to the screen.

In order to determine the position of the point touched on the screen, a correlation must be established between the output of the photodetector (i.e., the electrical output signal due to the increase in reflected light) and the movement of the scanning light beam across the screen. Accordingly a means for correlating is provided, operating on this correlative relationship, between the scan pattern and the time of occurrence of the photodetector output, for determing the position touched. This means utilizes two digital counters and an oscillator. One of these counters counts the scan lines in the vertical direction and the other counter counts resolution elements in the horizontal direction; these resolution elements will be represented by signals from the aforementioned oscillator. These elements and their interrelation are illustrated in FIG. 3 and their operation is as follows:

Counters 30 and 31 give an indication at any given instant of the X and Y coordinates of a point on the screen corresponding to the position on the screen of the scanning beam at that instant. Counter 31 counts each line scanned by the moving light beam giving an indication of displacement in the Y direction. This is done by using (counting) the horizontal synchronizing pulses from synchronization and driving circuitry 43 to provide an indication of each line scanned and the total number of lines which have been scanned. In order that the count of lines will begin anew at the end of each frame, the vertical synchronizing pulse from the light scanner is used to reset and start the counter again. A counter such as the Model 6146 made by Beckman Instruments will perform this function.

Increments of displacement in the horizontal or X direction must be supplied artifically since there is nothing inherent in the light scanner which will provide this function. This function is performed by oscillator 32. The scan line is divided, in time, into the desired number of horizontal resolution elements and an oscillator frequency is chosen which will provide the number of pulses (or cycles) per line equal to the desired number of resolution elements. The computation of the oscillator frequency is best illustrated by an example, as follows: For a scanning system of 500 lines per frame, 500 resolution elements per line and 30 frames per second, which is typical of the scanning system for use with this invention, the oscillator frequency will be 500 resolution elements/line$\times$500 lines/frame$\times$30 frames/second$=$7.5 mHz.

Counter 30 counts the pulses or cycles at the output of the oscillator and the horizontal synchronizing pulse is used to reset the counter to zero and begin the count anew at the beginning of each scan line. Thus, counter 30 provides the position in the X direction in terms of resolution elements counting away from the beginning of a scan line.

Now, having a means for determining position along the X and Y axis of the display screen, the coordinates of the point touched may be determined by stopping the counters when this point is reached in their respective counts. This is done by applying the output pulse from the photodetector to the stop input of each counter. The output pulse from the photodetector will occur as a result of the increase in reflected light when the scanning beam passes the point touched on the screen. Since, as explained above, the counter indication exactly corresponds, at every instant of time, to the position of the beam of light on the screen, stopping the counter by means of the photodetector output pulse gives an exact readout of the point touched on the screen, in terms of its X and Y coordinates.

The readout of the position coordinates from the X and Y counters as described above can be either a visual or electrical readout. The visual readout (i.e., simply reading the numbers displayed on the counters by visual means) is used when, over a relatively long time interval (5 to 10 seconds), the location of only a single point is desired. When, as in the example of a typewriter keyboard displayed on the screen, position information, as, which key is "touched," is changing faster than the normal rate for visual perception and recordation of the counter display, electrical readout of the counter is used. The electrical signal is converted to spatial information by a means such as an electronic computer which readily accepts the output signal from the counter, and compares it to a known input format (the typewriter beyboard) which is stored in its memory, determines the information conveyed and transfers that information to some other place in the computer for operation thereupon. Because of the extremely small amount of time required for the computer to "read" the counters, a very short "stop" time can be used for the counters thus enabling a rapid processing of information. Using the typewriter keyboard input format example, the computer would take the output signals from the counters, compare the coordinates so determined with the keyboard format stored in its memory, determine the character "touched," and send that character to some other place in the computer as part of an instruction to the computer, data for the computer, etc.

The technique described above, rather obviously, is also applicable to pictorial, graphical, and numerical displays for altering or interrogating the displays in the same manner as is now accomplished with a light pin, joy stick, or cursor. For example, by displaying an erase and a write button on the display screen together with some other information to be operated upon, touching the erase or the write button with a finger or a pointer and using another finger or other pointer to "touch" other specific areas of the display, these areas will be altered as desired.

Although touching of the screen has been heretofore suggested, it is not absolutely necessary that the screen be physically contacted. There are two parameters which control the distance of the reflective object from the screen for the system to operate, these being the reflectivity of the object and the signal-to-noise ratio obtainable from the reflected light and the light detection means. In general, the distance which the reflective object can be from the diffusion screen for satisfactory operation will be directly proportional to both the reflectivity of the object and the signal-to-noise ratio.

It is to be understood that the above described pattern generation and detection arrangement are merely illustrative of the application of the principles of the invention. Numerous other arrangements may be devised by those skilled in the art without departing from the spirit and the scope of the invention as defined by the appended claims.

What is claimed is:

1. In an information transfer system, comprising:
a light source for producing a light beam,
a diffusing screen which causes said impinging light beam from said source to be diffused and partially reflected,
light sensitive means responsive to change in light reflected from said diffusing screen, and
reflective means which when brought in proximity to the opposite surface of said diffusing screen from the impinging light beam produces a change in the amount of light reflected from said diffusing screen, thereby effecting information transferal to said light sensitive means.

2. The combination as in claim 1 wherein said light sensitive means is a photodetector.

3. In an information transfer system, comprising:
a light source for producing a beam of light,
a diffusing screen positioned such that said beam of light impinges thereon and is diffused and partially reflected,
means for scanning said beam of light in a known pattern across preselected points on said diffusing screen,
light sensitive means arranged so as to detect changes in the amount of light reflected from said diffusing screen, and movable reflective means which when brought in proximity to said diffusing screen, opposite from that surface on which said beam of light is incident, causes an increase in the amount of reflected light when said point is opposite the point of incidence of said beam of light, and said light sensitive means produces an electrical output in response to the increased reflected light falling thereupon.

4. The combination as in claim 3 wherein said light sensitive means is a photodetector.

5. The combination set forth in claim 3 further including means for correlating said known scan pattern to the time of occurrence of said electrical output, thereby providing position information about the point of increased reflected light.

6. The combination as in claim 3 wherein said means for scanning produces a raster scan pattern.

7. The combination set forth in claim 5 wherein said means for correlating said known scan pattern comprises at least counter means and oscillator circuit.

References Cited

UNITED STATES PATENTS

| | | | |
|---|---|---|---|
| 2,095,391 | 10/1937 | Legg | 178—7.6 |
| 3,016,421 | 1/1962 | Harmon | 178—19 |
| 3,128,340 | 4/1964 | Harmon | 178—18 |
| 3,328,523 | 6/1967 | Treseder et al. | 178—7.6 |
| 3,395,246 | 7/1968 | Stetten | 178—6.8 |
| 3,443,027 | 5/1969 | Dohler | 250—217 |

RICHARD MURRAY, Primary Examiner

B. L. LEIBOWITZ, Assistant Examiner

U.S. Cl. X.R.

250—217